United States Patent [19]

Gregory et al.

[11] Patent Number: 5,262,527
[45] Date of Patent: Nov. 16, 1993

[54] DISAZO DYES SUITABLE FOR USE IN INK JET PRINTING

[75] Inventors: Peter Gregory, Bolton; Ronald W. Kenyon, Failsworth; Prahalad M. Mistry, Ashton-under-Lyne, all of England

[73] Assignee: Imperial Chemical Industries PLC, London, England

[21] Appl. No.: 723,324

[22] Filed: Jun. 28, 1991

[30] Foreign Application Priority Data

Jul. 26, 1990 [GB] United Kingdom ............... 9016449

[51] Int. Cl.$^5$ .................. C09B 62/03; C09B 33/10; C09D 11/02
[52] U.S. Cl. .................... 534/797; 534/634; 534/728; 534/817; 534/821; 534/823; 534/829; 106/22 K; 106/20 D
[58] Field of Search ............... 534/605, 634, 728, 797, 534/817, 821, 823, 829, 612

[56] References Cited

U.S. PATENT DOCUMENTS

| | | | |
|---|---|---|---|
| 4,453,945 | 6/1984 | Miyamoto et al. | 534/612 X |
| 4,485,041 | 1/1984 | Hoyer et al. | 534/637 |
| 4,584,367 | 4/1986 | Matsuo et al. | 534/634 |
| 4,908,062 | 3/1990 | Balmforth et al. | 534/797 X |

FOREIGN PATENT DOCUMENTS

| | | | |
|---|---|---|---|
| 39-23971 | 10/1964 | Japan | 534/797 |
| 2166147 | 4/1986 | United Kingdom | 534/797 |

*Primary Examiner*—Mary C. Lee
*Assistant Examiner*—Fiona T. Powers
*Attorney, Agent, or Firm*—Cushman, Darby & Cushman

[57] ABSTRACT

Anionic azo compounds which, in the free acid form, have the Formula (1):

$$Ar^1N=N-J-X-(NR^1-L-NR^2-X)_n-J-N=NAr^2 \quad (1)$$

wherein: J is

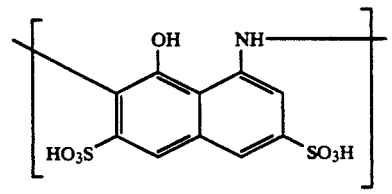

$Ar^1$ and $Ar^2$ are each independently aryl or substituted aryl providing at least one of $Ar^1$ and $Ar^2$ has at least one substituent selected from COOH and COSH;
each $R^1$ and $R^2$ is independently H, alkyl, substituted alkyl, alkenyl or substituted alkenyl;
L is a divalent organic linking group;
n is 0 or 1;
each X independently is carbonyl or a group of the formula (2), (3) or (4):

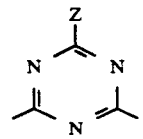

(2)

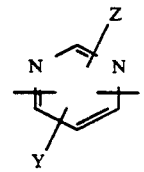

(3)

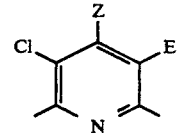

(4)

each Z independently is $NR^3R^4$, $SR^5$ or $OR^5$;
each Y independently is H, Cl, Z, $SR^6$ or $OR^6$;
each E independently is Cl or CN;
$R^3$, $R^4$, $R^5$ and $R^6$ are each independently H, alkyl, substituted alkyl, alkenyl, substituted alkenyl, aryl, substituted aryl, aralkyl, substituted aralkyl or $R^3$ and $R^4$ together with the nitrogen atom to which they are attached form a 5 or 6 membered ring;
provided the compound of Formula (1) has at least as many groups selected from —COOH and —COSH as —SO$_3$H groups.
The compounds are useful for the preparation of inks for use in ink-jet printing.

6 Claims, No Drawings

DISAZO DYES SUITABLE FOR USE IN INK JET PRINTING

This specification describes an invention relating to anionic compounds and particularly to anionic azo compounds which are useful as the coloured component of inks, particularly inks used in ink jet printing.

According to the present invention there are provided anionic azo compounds which, in the free acid form, have the structure shown in Formula (1):

wherein: J is

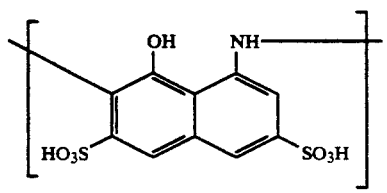

$Ar^1$ and $Ar^2$ are each independently aryl or substituted aryl providing at least one of $Ar^1$ and $Ar^2$ has at least one substituent selected from COOH and COSH;

each $R^1$ and $R^2$ is independently H, alkyl, substituted alkyl, alkenyl or substituted alkenyl;

L is a divalent organic linking group;

n is 0 or 1;

each X independently is carbonyl or a group of the formula (2), (3) or (4):

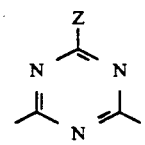

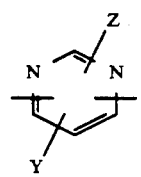

each Z independently is $NR^3R^4$, $SR^5$ or $OR^5$;
each Y independently is H, Cl, Z, $SR^6$ or $OR^6$;
each E independently is Cl or CN;
$R^3$, $R^4$, $R^5$ and $R^6$ are each independently H, alkyl, substituted alkyl, alkenyl, substituted alkenyl, aryl, substituted aryl, aralkyl, substituted aralkyl or $R^3$ and $R^4$ together with the nitrogen atom to which they are attached form a 5 or 6 membered ring;
provided the compound of Formula (1) has at least as many groups selected from —COOH and —COSH as —$SO_3H$ groups.

It is preferred that the dye of Formula (1) has at least as many —COOH groups as —$SO_3H$ groups.

The groups $Ar^1$ and $Ar^2$ are preferably independently selected from optionally substituted naphthyl and optionally substituted phenyl, especially optionally substituted phenyl. The optional substituents on $Ar^1$ and $Ar^2$ are preferably selected from alkyl, especially $C_{1-4}$-alkyl; alkoxy, especially $C_{1-4}$-alkoxy; —$SO_3H$; —$PO_3H_2$; —COSH; —OH; —$CO_2H$; halogen, especially Cl or Br; and optionally substituted $C_{1-4}$-alkyl. It is particularly preferred that when $Ar^1$ and $Ar^2$ are substituted the substituents are independently selected from $CO_2H$, COSH and $SO_3H$, especially $CO_2H$ and that at least one of $Ar^1$ and $Ar^2$ has at least one —$CO_2H$ substituent. In especially preferred structures, each of $Ar^1$ and $Ar^2$ has at least one —COOH substituent and more particularly at least two —COOH substituents as in, for example, dicarboxyphenyl.

It is preferred that the chromophores $Ar^1N=N—J—$ and $Ar^2N=N—J—$ are identical or similar such that they absorb approximately the same wavelength of light. The preferred compounds of Formula (1) are magenta compounds. It is also preferable that compounds of Formula (1) are free from cellulose reactive groups.

When X is of Formula (3) it is preferred that Z is attached to the carbon atom between the two ring nitrogen atoms and that Y is para to X. Each X is preferably of Formula (2).

Z is preferably $NR^3R^4$, especially $NHC_2H_4OH$, $N(C_2H_4OH)_2$, morpholino, $NH(C_{1-6}$-alkyl), $NH(CH_2)_2$—$CO_2H$, mono- or di-carboxyanilino, $NH.C_6H_4.SO_3H$, $NHCH_2SO_3H$ or $NHCH_2C_6H_4CO_2H$.

Each $R^1$ and $R^2$ is preferably H, $C_{1-6}$-alkyl or substituted $C_{1-6}$-alkyl. It is preferred that when $R^1$ or $R^2$ is substituted, the substituents are selected from —OH, —COOH and —$SO_3H$. As examples of $R^1$ and $R^2$ there may be mentioned H, methyl, ethyl, propyl, butyl, pentyl, hexyl, 3,3,5-trimethylhexyl, 2-hydroxyethyl, and allyl.

$R^3$, $R^4$, $R^5$ and $R^6$ are preferably each independently selected from H, $C_{1-10}$-alkyl, substituted $C_{1-10}$-alkyl, phenyl, substituted phenyl, $(CH_2)_{1-4}$-phenyl and substituted $(CH_2)_{1-4}$-phenyl. When $R^3$, $R^4$, $R^5$ or $R^6$ are substituted it is preferred that the substituent is selected from —OH, —$CH_3$, —$OCH_3$, —$SO_3H$ and —$CO_2H$. When $R^3$ and $R^4$ together with the nitrogen radical to which they are attached form a 5 or 6 membered ring it is preferred that they form a morpholine, piperazine or piperidine ring.

The identity of the divalent organic linking group L is not critical providing it does not interfere with the performance of the compound. As examples of divalent organic linking groups represented by L there may be mentioned:

(a) divalent aliphatic radicals, preferably those containing from 2 to 6 carbon atoms, such as ethylene, trimethylene, propylene, tetramethylene, alpha:beta-dimethylethylene and hexamethylene radicals;

(b) divalent aromatic homocyclic radicals in which at least one of the terminal links is through an aliphatic carbon atom, for example as in the benzylene —$C_6H_4.CH_2$— or the xylylene —$CH_2C_6H_4CH_2$— group;

(c) divalent monocyclic or fused polycyclic aromatic radicals, for example of the benzene, naphthalene, anthraquinone or fluorene series, such as
1,3- or 1,4-phenylene
2-nitro-1,4-phenylene 3-sulpho-1,4-phenylene
4-methoxy-1,3-phenylene
4-sulpho-1,3-phenylene
4-nitro-1,3-phenylene
2-carboxy-1,4-phenylene
2-chloro-1,4-phenylene
4-carboxy-1,3-phenylene
3,7-disulpho-1,5-naphthylene
2-methoxy-1,4-phenylene;

(d) divalent radicals wherein the terminal bonds are attached to carbon atoms of two phenyl or naphthalene nuclei which are joined together either through a direct link or through an atom or chain of atoms which may form a homocyclic or heterocyclic ring. Of this type, there may be mentioned as examples divalent radicals derived from
diphenyl
azobenzene
diphenyloxide
diphenyloxadiazole
diphenylamine
benzanilide
diphenylsulphide
diphenylurea
diphenylsulphone
1,2-bis(phenylcarbamyl)ethylene
diphenylmethane
1,4-bis-(phenylcarbamyl)butadiene
diphenylketone
1,2-bis-(phenylcarbamyl)ethane
diphenylethane
1,3-bis-(phenylcarbamyl)propane
diphenylethylene 2,4-dianilino-s-triazine; and (e) nuclear substituted derivatives of the above, for example, containing COOH, methyl, nitro and/or sulphonic acid and/or chlorine atoms as substituents in the phenyl or naphthalene nuclei.

Alternatively the group $NR^1LNR^2$ can be piperazine in which the two ring nitrogen atoms are bonded to the groups represented by X.

It is to be understood that the present invention relates not only to compounds of formula (1) but also to the salts thereof, particularly the salt with an alkali metal, ammonia or substituted amines, especially ammonia or substituted amines which are volatile at room temperature. It is also to be understood that whilst formulae (2), (3) and (4) are represented in neutral form, the present invention also covers the quaternary salts thereof, particularly where the compound of formula (1) is in zwitterionic form.

According to a further aspect of the present invention there is provided a process for the preparation of compounds of formula (1) comprising (i) diazotisation of amines of formulae $Ar^1NH_2$ and $Ar^2NH_2$ with a diazotising agent such as $HNO_2$, in the cold and preferably below 5° C. to give the corresponding diazonium salts;

(ii) condensation of HJH with a compound of the formula halo-X-halo, preferably cyanuric chloride, preferably in the presence of base, to give a compound of formula HJ-X-halo in which X is as defined above except that Z is Cl;

(iii) coupling each of the diazonium salts from (i) above with an equivalent of a compound of formula HJ-X-halo to give compounds of the formula $Ar^1N=N-J-X$-halo and $Ar^2N=N-J-X$-halo in which each X is the same or different to each other and in which each X is as defined above except that Z is Cl;

(iv) the products from (iii) are each condensed with an amine of formula $NHR^1-L-NR^2H$;

(v) condensation of the product from (iv) with a compound of formula ZH, preferably in the presence of base;

wherein $Ar^1$, $Ar^2$, J, X, L, $R^1$, $R^2$ and Z are as defined above unless otherwise stated.

As examples of amines of formulae $Ar^1NH_2$ and $Ar^2NH_2$ which may be used in the preparation of compounds of Formula (1), there may be mentioned
2-aminoisophthalic acid
3-amino-4-fluorobenzoic acid
4-aminoisophthalic acid
3-amino-5-hydroxybenzoic acid
5-aminoisophthalic acid
3-amino-4-hydroxybenzoic acid
3-aminophthalic acid
3-amino-2-hydroxybenzoic acid
4-aminophthalic acid
2-amino-6-hydroxybenzoic acid
2-aminoterephthalic acid
2-amino-4-nitrobenzoic acid 3-aminobenzoic acid
3-amino-5-nitrobenzoic acid 4-aminobenzoic acid
2-nitro-3-aminobenzoic acid
anthranilic acid
2-nitro-5-aminobenzoic acid
4-sulphoanthranilic acid
3-nitro-4-aminobenzoic acid
5-sulphoanthranilic acid
3-acetylamino-5-aminobenzoic acid
2-amino-4-chlorobenzoic acid
3-amino-4-methylbenzoic acid
2-amino-5-chlorobenzoic acid
2-amino-3-methylbenzoic acid
3-amino-4-chlorobenzoic acid
3-amino-4-methoxybenzoic acid
5-amino-5-chlorobenzoic acid
3-amino-4-hydroxybenzoic acid
2amino-5-methylbenzoic acid
4-aminosalicylic acid
2-amino-6-methylbenzoic acid
5-aminosalicylic acid
2-amino-5-bromobenzoic acid
3-amino-2-naphthoic acid
2-n-butoxy-4-aminobenzoic acid
5-amino-2-naphthoic acid
8-amino-2-naphthoic acid The compounds of Formula (1) are especially useful for the preparation of inks, especially aqueous inks, used in ink jet printing and particularly thermal ink jet printing. The inks can be prepared according to known formulations.

The invention is further illustrated by the following Examples in which all parts and percentages are by weight unless otherwise indicated.

Example 1

Preparation of the compound of Formula (5) in which Z is $NH(CH_2)_3CH_3$

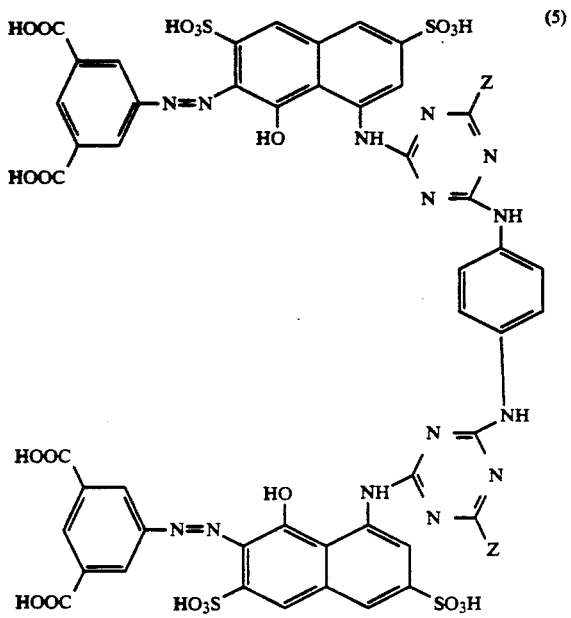

Cyanuric chloride (20 g) was dissolved In acetone (200 ml) and added to stirred ice/water (500 g).

1-hydroxy-8-aminonaphthalene-3,6-disulphonic acid (0.1 Mol) was added to water (500 ml) and the pH adjusted to 7.0 by addition of 47% sodium hydroxide solution. This solution was then added over ¼ hour to the cyanuric chloride suspension at 0°-5° C. After 1¼ hours, reaction was complete and the solution screened to remove trace insoluble matter to give a dichlorotriazinyl derivative.

5-aminoisophthalic acid (18.1 g) was added to water (500 ml) and the pH adjusted to 8.0 by addition of 2N sodium hydroxide. Sodium nitrite (7 g) was added and the solution added at 0°-5° C. over 10 minutes to a mixture of concentrated hydrochloric acid (40 ml) and water (450 ml). After 1¼ hours, excess nitrous acid was removed by addition of a little sulphamic acid to give a diazo suspension.

The above solution of dichlorotriazinyl derivative was then added to the diazo suspension at 0°-10° C. the pH being maintained at 7.0 by addition of 2N sodium hydroxide. Coupling was complete after 1 hour to give a dichlorotriazinyl azo compound.

p-Phenylene diamine (4.86 g) was dissolved in acetone (50 ml) and the solution then added to the above dichlorotriazinyl azo compound. The temperature was raised to 20°-25° C. and the pH maintained at 6-7. It was stirred for 18 hours. The temperature was raised to 30°-35° C. and salted to 20%. 2N hydrochloric acid was added until the pH was 3.5 and the product filtered off and washed with 20% sodium chloride solution and dried to give a bis-monochlorotriazinyl compound.

22.6 g of the bis-monochlorotriazinyl compound was added to water (300 ml) and n-butylamine (15 g) added. The mixture was stirred at 70°-75° C. for 3 hours. The pH was adjusted to 7.5 by addition of concentrated hydrochloric acid and salted to 20% with ammonium chloride. The product was filtered off and washed with 20% ammonium chloride solution.

The product was added to water (400 ml) and the temperature raised to 70° C. Ammonium chloride (80 g) was added and then slowly acidified to pH 1.5 by addition of concentrated hydrochloric acid. The title compound in free acid form was filtered and washed with 20% ammonium chloride solution.

The title compound in free acid form was then added to water and the pH raised to 9.0 by addition of concentrated ammonium hydroxide solution. The solution was dialysed to remove chloride ions, screened and evaporated. Yield 13.5 g.

When made into an ink by dissolving in water/diethylene glycol (92.5/7.5) and printed onto plain paper using a thermal ink-jet printing machine the ammonium salt of the title compound gave bright magenta shades with good water fastness and good light fastness. The same water/diethylene glycol mixture was used as the solvent in the inks described in subsequent Examples.

EXAMPLE 2

Preparation of the compound of Formula (5) in which Z is $NH(CH_2)_2OH$

In place of the 15 g of n-butylamine used in Example 1 there was used 12.59 of 2-aminoethanol. The ammonium salt of the title compound, when made into an ink and printed onto plain paper using a thermal ink-jet printing machine, gave bright magenta shades with very good water fastness and good light fastness.

EXAMPLE 3

Preparation of the compound of Formula (5) in which Z is $NH_2$

In place of the 15 g of n-butylamine used in Example 1 there was used 50 ml of concentrated ammonium hydroxide. The ammonium salt of the title compound, when printed onto plain paper using a thermal ink-jet printing machine, gave bright magenta shades with good water fastness and good light fastness.

EXAMPLE 4

Preparation of the compound of Formula (6) in which Z is NHCH$_2$CH$_2$OH

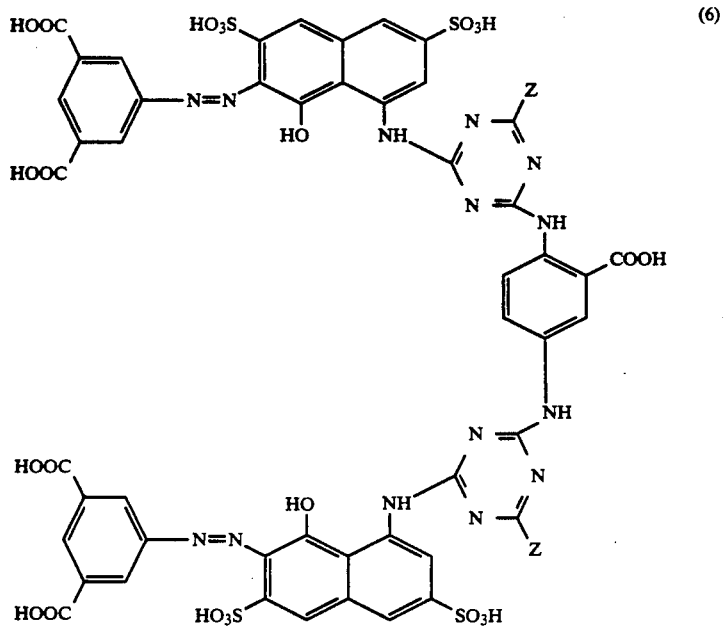

(6)

In place of the 4.86 g of p-phenylenediamine used in Example 2 there was used 6.84 g of 2,5-diaminobenzoic acid. The ammonium salt of the title compound when made into an ink and printed onto plain paper using a thermal ink jet printing machine gave bright magenta shades with very good water fastness and good light fastness.

EXAMPLE 5

Preparation of the compound of Formula (7) in which Z is NHCH$_2$CH$_2$OH

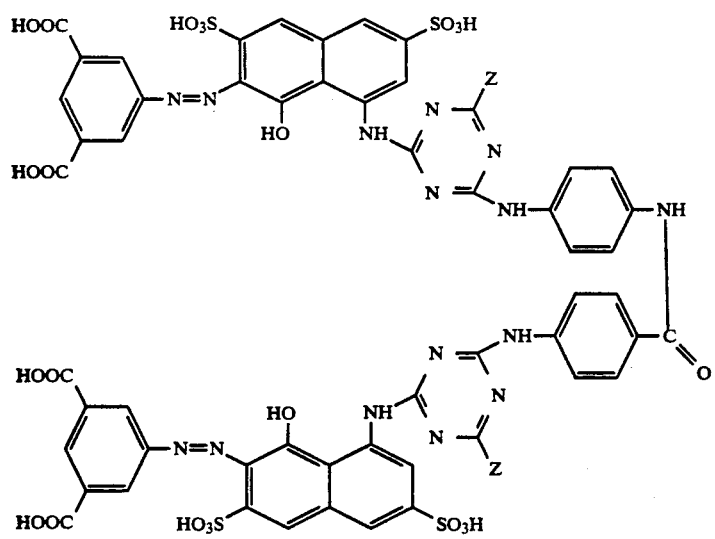

(7)

In place of the 4.86 g of p-phenylenediamine used in Example 2 there was used 10.2 g of 4,4'-diaminobenzanilide. The ammonium salt of the title compound when made into an ink and printed onto plain paper using a thermal ink jet printing machine gave bright magenta shades with very good water fastness.

EXAMPLE 6

Preparation of the compound of Formula (5) in which Z is morpholino

In place of the 15 g of n-butylamine used in Example 1 there was used 17.9 g of morpholine. The ammonium salt of the title compound, when made into an ink and printed onto plain paper using a thermal ink-jet printing machine gave bright magenta shades with good water fastness.

EXAMPLE 7

Preparation of the compound of Formula (5) in which Z is N(C$_2$H$_4$OH)$_2$

In place of the 15 g of n-butylamine used in Example 1 there was used 21.6 g of diethanolamine. The ammonium salt of the title compound when made into an ink and printed onto plain paper using a thermal ink-jet printing machine gave bright magenta shades with good water fastness.

EXAMPLE 8

Preparation of the compound of Formula (5) in which Z is $NHCH_2CO_2H$

In place of the 15 g of n-butylamine used in Example 1 there was used 15.4 g of glycine. The ammonium salt of the title compound when made into an ink and printed onto plain paper using a thermal ink-jet printing machine gave bright magenta shades with good water fastness.

EXAMPLE 9

Preparation of the compound of Formula (6) in which Z is $NH_2$

In place of the 4.86 g of p-phenylenediamine used in Example 3 there was used 6.84 g of 2,5-diaminobenzoic acid. The ammonium salt of the title compound when made into an ink and printed onto plain paper using a thermal ink-jet printing machine gave bright magenta shades with good water fastness and good light fastness.

EXAMPLE 10

Preparation of the compound of Formula (5) in which Z is $NH(CH_2)_3OH$

In place of the 15 g of n-butylamine used in Example 1 there is used 15.4 g of 3-aminopropanol. The ammonium salt of the title compound when made into an ink and printed onto plain paper using a thermal ink-jet printing machine gives bright magenta shades with very good water fastness and good light fastness.

EXAMPLE 11

Preparation of the compound of Formula (5) in which Z is $NHCH_3$

In place of the 15 g of n-butylamine used in Example 1 there is used 16 g of a 40% aqueous solution of methylamine. The ammonium salt of the title compound when made into an ink and printed onto plain paper using a thermal ink-jet printing machine gives bright magenta shades with very good water fastness and good light fastness.

EXAMPLE 12

Preparation of the compound of Formula (5) in which Z is $NH(CH_2)_6OH$

In place of the 15 g of n-butylamine used in Example 1 there is used 24 g of 6-hydroxyhexylamine. The ammonium salt of the title compound when made into an ink and printed onto plain paper using a thermal ink-jet printing machine gives bright magenta shades with good water fastness.

EXAMPLE 13

Preparation of the compound of Formula (5) in which Z is $NH(CH_2)_5CH_3$

In place of the 15 g of n-butylamine used in Example 1 there is used 20.8 g of n-hexylamine. The ammonium salt of the title compound when made into an ink and printed onto plain paper using a thermal ink-jet printing machine gives bright magenta shades with good water fastness.

EXAMPLE 14

Preparation of the compound of Formula (8) in which Z is $NHCH_2CH_2OH$

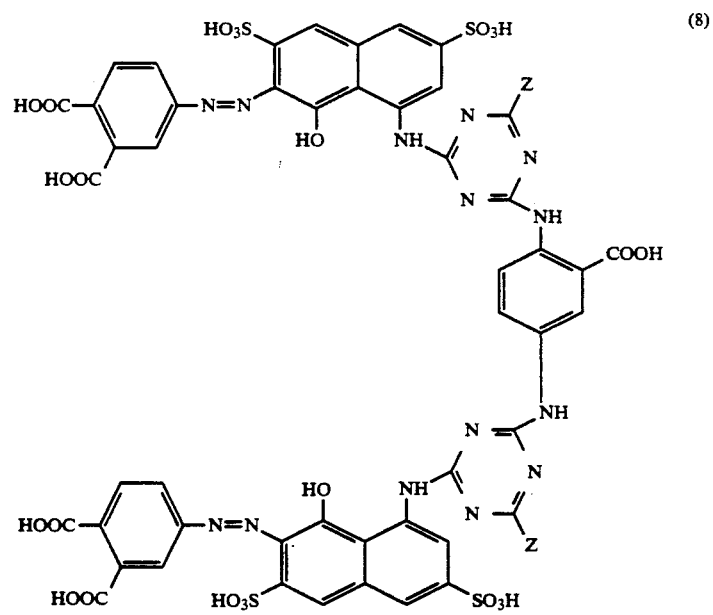

In place of the 18.1 g of 5-aminoisophthalic acid used in Example 4 there is used 18.1 g of 4-aminophthalic acid. The ammonium salt of the title compound when made into an ink and printed onto plain paper using a thermal ink jet printing machine gives bright magenta shades with very good water fastness and good light fastness.

EXAMPLE 15

Preparation of the compound of Formula (9) in which Z is NHCH$_2$CH$_2$OH

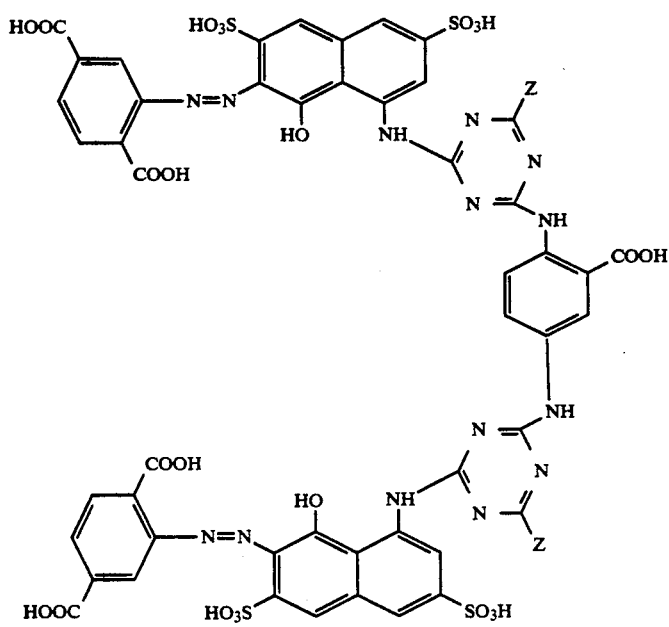

(9)

In place of the 18.1 g of 5-aminoisophthalic acid used in Example 4 there is used 18.1 g of 2-aminoterephthalic acid. The ammonium salt of the title compound when made into an ink and printed onto plain paper using a thermal ink jet printing machine gives bright magenta shades with very good water fastness and good light fastness.

EXAMPLE 16

Preparation of the compound of Formula (5) in which Z is 4-carboxybenzylamino

In place of the 15 g of n-butylamine used in Example 1 there is used 15 g of 4-(aminomethyl)-benzoic acid. The ammonium salt of the title compound when made into an ink and printed onto plain paper using a thermal ink-jet printing machine gives bright magenta shades with good water fastness.

We claim:

1. An anionic azo compound which, in the free acid form, has the Formula (1):

wherein: J is

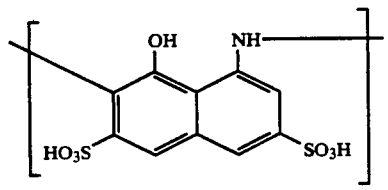

Ar$^1$ and Ar$^2$ are each independently aryl or substituted aryl providing at least one of Ar$^1$ and Ar$^2$ has at least one substituent selected from COOH and COSH;

each R$^1$ and R$^2$ is independently H, alkyl, substituted alkyl, alkenyl or substituted alkenyl;

L is a divalent organic linking group;

n is 0 or 1;

each X independently is carbonyl or a group of the formula (2), (3) or (4):

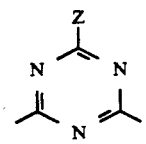

(2)

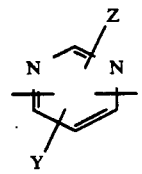

(3)

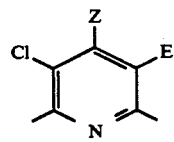

(4)

each Z independently is NR$^3$R$^4$, SR$^5$ or OR$^5$;

each Y independently is H, Cl, or Z each E independently is Cl or CN;

R$^3$, R$^4$, and R$^5$ are each independently H, alkyl, substituted alkyl, alkenyl, substituted alkenyl, aryl, substituted aryl, aralkyl, substituted aralkyl or R$^3$ and R$^4$ together with the nitrogen atom to which they attached form a morpholine, piperazine or piperidine ring;

provided the compound of Formula (1) has at least as many —COOH groups as —SO$_3$H groups.

2. A compound according to claim 1 or wherein at least one of Ar$^1$ and Ar$^2$ has at least one —COOH substituent.

3. A compound according to claim 2 wherein each of Ar$^1$ and Ar$^2$ has at least one —COOH substituent.

4. A compound according to claim 3 wherein each of $Ar^1$ and $Ar^2$ has at least two —COOH substituents.

5. A compound according to claim 4 wherein each of $Ar^1$ and $Ar^2$ is dicarboxyphenyl.

6. A compound according to any preceding claim wherein X is a group of Formula (2) and Z is selected from —$NHC_2H_4OH$, —$N(C_2H_4OH)_2$, —$NH(C_{1-6}$-alkyl) and morpholino.

* * * * *